United States Patent Office 2,859,822
Patented Nov. 11, 1958

2,859,822

COMPOSITION FOR SEALING PERMEABLE FORMATIONS

James M. Wright, Pittsburgh, Pa., assignor to Pan American Petroleum Corporation, Tulsa, Okla., a corporation of Delaware No Drawing. Application April 25, 1957
Serial No. 655,017

14 Claims. (Cl. 166—42)

This invention relates to an improved composition and process for temporarily sealing pores or fractures in a formation penetrated by a well. More particularly, this invention relates to an improved bridging material and suspending liquid, which are adapted to plug highly permeable zones, such as fractures, in a well during hydraulic fracturing operations.

In United States Patent 2,734,861, Scott et al., a method of producing multiple fractures in formations by the application of hydraulic pressures is described. In that process it is proposed to incorporate temporary bridging materials in a fracturing liquid to plug existing fractures or other high-permeability zones in a formation penetrated by a well so that additional fractures can be produced in said formation by performing in sequence a series of steps involving temporarily plugging said existing fractures or zones and then creating new fractures in said formation.

The temporary bridging agent described in the aforementioned Scott et al. patent is a polycyclic aromatic hydrocarbon, preferably naphthalene. Millions of pounds of naphthalene have been used in successful multiple fracturing operations in thousands of wells. Nevertheless, several improvements are desirable. First, naphthalene is rather expensive since the purified form must be used in order that the material have the strength required of a bridging agent. A less expensive bridging agent would obviously be of interest. Second, even the purified forms of naphthalene have only a limited ability to seal fractures. A stronger temporary bridging agent, more effective in sealing fractures, would be very useful. Third, naphthalene becomes rather highly soluble in oil at elevated temperatures. Therefore, if a deep, high-temperature well is to be fractured, a very large amount of naphthalene must be added to the fracturing fluid so it will not all dissolve before reaching the bottom of the well. Fourth, the melting point of purified naphthalene is only about 176° F. (80° C.). This is quite adequate for a large percentage of present wells. Each year, however, the average depth of oil wells increases. The bottom-hole temperatures increase correspondingly. Many wells now have bottom-hole temperatures far above 176° F. A temporary bridging agent higher melting than naphthalene is usually required for such wells.

With the above problems in mind, an object of this invention is to provide an improved composition for the process of producing multiple fractures in the formations penetrated by a well. It is a more specific object of this invention to provide an improved slurry, including a novel temporary bridging material incorporated in a liquid, for producing multiple fractures in a formation penetrated by a well. A still further object of this invention is to provide an improved composition for temporarily sealing fractures and highly permeable formations to regain lost circulation during the drilling of oil and gas wells. A more particular object of the invention is to provide a fracturing composition containing a temporary bridging agent which is less expensive, stronger, less oil soluble, and higher melting than the naphthalene now in commercial use. Other objects will be apparent to those skilled in the art from the following description and claims.

My composition comprises hexachlorocyclohexane in a carrier liquid. Hexachlorocyclohexane is also sometimes called benzene hexachloride since it is produced by the chlorination of benzene in the presence of light. Although the name benzene hexachloride is technically a misnomer, the terminology has persisted and the name is often abbreviated to BHC for convenience. This term BHC will be employed hereinafter to mean hexachlorocyclohexane.

Many isomers of BHC exist. The four principal ones are alpha, beta, gamma, and delta. Table A summarizes the properties of these isomers and their proportions in the normal reaction mixture resulting from chlorinating benzene in the presence of light. This information is summarized, for the most part, from an article entitled "The Gamma-Isomer of Hexachlorocyclohexane" by R. E. Slade in Chemistry and Industry, volume 40, October 13, 1945, page 314. The table also includes some data on naphthalene for comparison.

Table A

| Property | Hexachlorocyclohexane Isomers | | | | Naphthalene |
|---|---|---|---|---|---|
| | Alpha | Beta | Gamma | Delta | |
| Melting Point, °F | 316 | 588 | 234 | 280 | 176 |
| Solubility, g./100 g. at 20° C.: | | | | | |
| In Petroleum Distillate | 0.8 | 0.02 | 2.0 | 1.1 | [1] 13 |
| In Methanol | 2.3 | 1.6 | 7.4 | 27.3 | |
| In Water (p. p. m.) | (10) | (5) | (10) | (10) | (30) |
| Toxicity to Rats, Grams/Kilogram for 50% Kill | 1.7 | None | 0.19 | 1.0 | |
| Percent Isomer in Normal Mixture | 70 | 5 | 10 | ? | |

[1] In kerosene.

It will be apparent that the melting points of even the lowest melting BHC isomers are much greater than that of naphthalene. The solubilities of the isomers in oil vary considerably, but most of them are less than 1/10 the solubiilty of naphthalene in oil. Even the beta isomer, however, has some solubility, so it will be slowly dissolved in oil produced from a fracture temporarily blocked by BHC. The solubilities of the isomers in methanol are presented to explain how methanol extraction can be used for separating the alpha and beta isomers from the others. The toxicity values explain why the separation is usually made. The gamma isomer is the highly toxic insecticide sold under the trademark Lindane. This isomer is extracted from the mixed isomers by methanol. The methanol also dissolves the delta isomer and most of the impurities such as the more highly chlorinated derivatives. This leaves a solid cake residue which is commonly referred to as alpha-beta cake. Although the Lindane sells for about $3 per pound, the alpha-beta cake sells for only a few cents per pound as a by-product.

The entire mixture of isomers is sometimes a solid material, but frequently it is a syrup due to the large variety of isomers and impurities. The alpha-beta cake, on the other hand, is a hard, solid material. If a good methanol extraction has been made, the melting point of the cake will be above 300° F. With less efficient extractions more impurities will be present and the melting point will be somewhat lower. Such alpha-beta cakes having lower meling points will also usually be somewhat softer and weaker; therefore, for my purposes such material should have a melting point of at least about 200° F.

Of course, the syrupy mixtures of isomers and impurities cannot be used for my purposes. Any pure isomer can be used, however, or any mixture which is sufficiently pure to have a melting point above about 200° F. Preferably the gamma isomer should be present in only small amounts because of its toxicity. The alpha-beta cake is greatly preferred because of its low cost, its high melting point, its strength, and its low toxicity. When reference is made hereinafter to hexachlorocyclohexane melting above about 200° F., it will be understood that either a pure isomer or a mixture of isomers melting above about 200° F. is intended. Impurities may also be present so long as they do not greatly decrease the strength or melting point of the isomer or mixed isomers.

The melting point and strength of BHC isomers, such as alpha-beta cake, can frequently be increased by extraction or other operations to improve the purity. Strength can also sometimes be increased by melting and regrinding alpha-beta cake. A possible explanation is that the extraction of Lindane and other materials from the alpha and beta isomers may leave the remaining alpha-beta cake porous and weak. Remelting may convert it to a stronger nonporous state. In some cases partial fusion has produced stronger material than complete fusion. The reasons for this behavior are not known.

The carrier liquid may be any liquid commonly used in fracturing operations, such as oil or water. Preferably it should be water or a petroleum oil; that is, crude petroleum or a fraction thereof. It should also preferably be a liquid which has a considerably retarded tendency to filter through the formation. It may, for example, be a liquid having considerable viscosity. The viscosity may be, and preferably is, at least about 30 centipoises as measured at about 80° F., using a Stormer viscosimeter rotating at about 600 R. P. M. Carrier liquids having viscosities up to 5,000 centipoises or even higher are sometimes used. The high viscosity not only decreases the tendency of the liquid to filter through the formation, but also aids in supporting the BHC. Loss of the carrier liquid to permeable formations can also be decreased by adding plastering agents, in addition to the BHC, to aid in forming an impermeable filter cake over the face of the formation.

If an oil such as a petroleum fraction is employed as the carrier liquid, the viscosity can be increased by the addition of soaps, resins, and the like. Filter cake formers, such as blown asphalt, may also be added. Such additives are described in more detail in the aforementioned 2,734,861 Scott et al. If the carrier liquid is water, the water may be thickened and a filter cake can be formed by addition of colloids such as starch, sodium carboxymethyl cellulose, clay, or the like to the water. Other additives will occur to those skilled in the art for thickening water or oil and aiding the BHC in laying down a filter cake.

Since the density of BHC is rather high, about 1.8 grams per cubic centimeter, it tends to settle rapidly in nonviscous, low-density liquids such as most oil and water. Therefore, in many applications such as in drilling fluids, where the slurry may stand quiescent for a period of several minutes, or even where the rate of flow is slow, as in small shallow fracturing jobs, the viscosity of the carrier liquids should be at least about 30 centipoises in order to prevent excessive settling of the BHC particles. Preferably, the carrier liquid should also have at least a small gel or sheer strength to aid in supporting the BHC particles. In fracturing operations where high injection rates are involved, turbulence alone may be sufficient to keep the BHC in suspension. Even here, however, a carrier liquid having a viscosity of at least about 30 centipoises is preferred not only to prevent settling of the BHC particles, but also to aid in extending the fracture a greater distance from the well.

Settling can also be decreased by increasing the density of the carrier liquid. For example, the density of aqueous carrier liquids can be increased by dissolving in them solids such as sodium chloride, zinc chloride, or the like. The density of oily carrier liquids can be increased by addition of oil soluble liquids such as carbon tetrachloride or oil soluble solids such as ethylene iodide. Finely divided solids such as barium sulphate or ground oyster shells can also be used to increase both the density and viscosity of either water or oil. These solids are usually ground to pass a number 325 U. S. standard sieve so they are much more easily supported by the liquid than the relatively coarse particles of BHC.

The slurry of BHC in the carrier liquid may be prepared by batch mixing at the surface. Alternatively, the slurry may be produced by mixing the ingredients in the tubing or by a jet-type mixer as the base liquid enters the tubing. The amount of bridging material added to the carrier liquid may be varied over a substantial range depending, among other things, upon the consistency of the carrier liquid and the amount of liquid which is to be injected into a fracture before that fracture is sealed. I have found, for example, that a bridge will form in a fracture more rapidly the higher the concentration of the bridging material. The concentration of the bridging material cannot, however, be increased indefinitely since pumps are unable to handle extremely high concentrations. It is considered desirable in most cases to inject between about 1 and about 10 barrels of fracturing liquid, or the carrier liquid therein, into a fracture before that fracture is sealed.

Due to the lower solubility of BHC in oil and water, not as much BHC as naphthalene is required to saturate the carrier liquid. This is particularly true for high temperature wells. As shown in the example, BHC is more effective as a fracture sealing agent than naphthalene. A lower concentration of BHC may be used in the fracturing slurry because of the lower solubility in the carrier liquid and the greater effectiveness as a fracture bridging material. On the other hand, it may be desired to use approximately the same concentrations as normally used for naphthalene in order to obtain better bridging action. For most operations, the concentration of BHC should be from about 50 to about 300 pounds per 42-gallon barrel of the carrier liquid. For special cases, higher or lower concentrations may be used.

The BHC is preferably added to the fracturing liquid in a gradation of particle sizes since uniform-sized particles are less effective in sealing permeable formations. The coarser particles bridge in a fracture or pore but by themselves offer only a minor amount of resistance to flow. The particles of intermediate size bridge on the larger particles and thus provide a base on which the finer particles bridge. The finer particles then produce a high resistance to flow and, in effect, plug the larger fractures and pores. Similarly, the fine particles themselves bridge the smaller fractures and pores and increase the resistance to flow of liquids into the formations. The advantages of both large and small particles are obtained in a bridging material having a gradation of particle sizes. For best results the particle sizes should be uniformly distributed throughout the range from those which will barely pass a number 4 U. S. standard sieve to those which will be barely retained on a number 100 U. S. standard sieve. Satisfactory seals can be obtained by using a particle size distribution in which about 0 to about 75 percent of the particles are in the range passing a number 4 sieve and retainable on a number 10 sieve, from about 15 to about 90 percent are in the range passing a number 10 sieve and retainable on a number 40 sieve, and from about 10 to about 80 percent are in the range passing a number 40 sieve and retainable on a number 100 sieve. A small amount of the particles may be slightly too large to pass a number 4 sieve so long as their size and concentration are sufficiently small to permit pumping of the slurry by the equipment available. Particles sufficiently small to pass a number 100 sieve may also be present so long as their concentration is not sufficient to cause an excessive increase in viscosity of the slurry. In some cases it may be desirable to include these small particles deliberately in order to increase the viscosity into a desirable range. When reference is made to a gradation of particles passing a number 4 sieve and retainable on a number 100 sieve, a gradation substantially within the above limits is intended.

Many of the advantages of a temporary seal over a permeable oil-producing formation can be obtained even though a portion of the sealing material is not oil soluble. Thus, up to about 50 percent of the sealing material may be oil insoluble. When oil dissolves the oil soluble portion of the seal, permeability through the seal will be reestablished. Frequently, after the desired fracture has been formed, the entire seal will collapse and be completely removed. Preferably, the inert material should be a strong hard solid such as ground nut shells, peach seeds, plastic, coarse sand, or the like. It will then tend to re-enforce the bridge and seal formed by the BHC. For best results, the inert particles should be in the upper portion of the particle size range, preferably passing a number 4 sieve and being retainable on a number 10 sieve. If a good reenforcing action is to be retained, the strong inert material should make up at least about 25 percent by weight of the total sealing particles.

If the slurry is to be used as a fracturing liquid, it may be displaced to the bottom of the well by, for example, pumping crude oil into the tubing following the slurry. Pressure is then applied until the pressure at the formation is great enough to fracture or part the formation. This process is described in detail in Re. 23,733. Filtrate from the fracturing liquid then flows into the fracture or passage in the formation until a bridge is produced in the well over the fracture and the fracture is sealed. If sufficient pressure is applied, the formation can be fractured again and again at different locations, each successive fracture being closed before a high pressure can be built up to produce the next fracture. Only one batch of the slurry need be employed for all such fractures.

It will be apparent that my composition can be used in other processes than that above described. For example, when a fracture is produced and sealed and before a well is produced to remove the bridging material, a liquid, such as the carrier liquid which does not contain the bridging material, may be injected into the formation at high pressure to produce a second fracture at the next weakest zone in the well. That fracture may be extended into the formation by pumping the liquid thereinto and then the fracture may be sealed, if desired, by a subsequent injection of the fracturing liquid which contains bridging material.

The superior effectiveness of BHC for sealing fractures was demonstrated by the following example. A slit about 1 inch long and about 0.06 inch wide was formed in a sheet of steel. This sheet was sealed across a 1¼ inch pipe by use of a modified union and O-ring. A slurry of alpha-beta cake particles in a concentration of 10 pounds per 42-gallon barrel was then pumped through the pipe and slit to determine if the particles of the cake would seal the slit. The test was repeated using various concentrations and slit widths. Comparative tests were made using naphthalene. The carrier liquid in every case was an aqueous mud containing about 10 percent by weight of clay. Water was used as the carrier liquid rather than oil to avoid differences in results due to the difference in solubilities of alpha-beta cake and naphthalene in oil. The clay was added to insure that the particles of alpha-beta cake and naphthalene would not settle out, but would remain suspended in the carrier liquid. Both the alpha-beta cake and naphthalene were ground to produce a distribution of particle sizes. Particles which were retained on a 4 mesh screen were discarded. Particles passing a 100 mesh screen were also eliminated. In the alpha-beta cake sample, 50 percent by weight of the sample passed a 12 mesh screen while the other 50 percent was retained on the 12 mesh screen. Screen analysis of the napthalene sample showed that 50 percent passed a 10 mesh screen while the other 50 percent was retained on this screen. Thus, the two samples were substantially the same. Results of the tests are presented in Table B. The concentrations are in pounds per 42-gallon barrel of the carrier liquid.

*Table B*

| Concentration, lb./Bbl. | Slit Width, Inches | Pressure Attained | |
|---|---|---|---|
| | | Alpha-Beta Cake | Naphthalene |
| 10 | 0.06 | 325 | 300 |
| 10 | 0.08 | 275 | 200 |
| 10 | 0.10 | 200 | 175 |
| 10 | 0.12 | 125 | 125 |
| 20 | 0.06 | Sealed | 300 |
| 20 | 0.08 | Sealed | 225 |
| 20 | 0.10 | 225 | 175 |
| 20 | 0.12 | 150 | 100 |
| 30 | 0.06 | Sealed | 275 |
| 30 | 0.08 | 350 | 200 |
| 30 | 0.10 | 225 | 150 |
| 30 | 0.12 | 150 | 100 |
| 50 | 0.06 | Sealed | Sealed |
| 50 | 0.08 | 375 | 200 |
| 50 | 0.10 | 250 | 175 |
| 50 | 0.12 | 150 | 100 |
| 80 | 0.06 | Sealed | Sealed |
| 80 | 0.08 | Sealed | Sealed |
| 80 | 0.10 | 300 | 175 |
| 80 | 0.12 | 150 | 125 |

In most of the tests the pressure of liquid behind the slit would increase as a bridge formed over the slit, restricting the rate of flow. The bridge would then break, allowing rapid flow to occur again with a corresponding drop in pressure. The pressures presented in the table are the maximum pressures observed while pumping several gallons of slurry through the slit. When the concentration of bridging agent was sufficient to form a good seal over the slit, the pressure rose rapidly above 400 pounds per square inch. Thus, the term "sealed" in the table indicates the pressure rose rapidly toward, or usually past, 400 pounds per square inch. In such cases the pump was quickly shut down. Sometimes, however, the pressure rise was so rapid that it exceeded the 500 pound rupture pressure of the safety blow-out disk in the system before the pump could be shut down.

The data in Table B show a distinct and consistent superiority of the alpha-beta cake over the naphthalene. When this superiority is considered, together with the lower oil solubility and higher melting point of the alpha-beta cake, it will be apparent that, by use of this material, I can accomplish the objects of my invention.

This invention has been described principally by reference to certain preferred embodiments, particularly in formation fracturing operations. It will be apparent, however, that the invention is not limited to the hydraulic fracturing process, but is applicable to a number of well treating operations. For example, in the drilling of oil wells through permeable oil producing formations, it is sometimes desirable to plug such permeable formations temporarily to prevent loss of the drilling fluid into such formations. Clearly, hexachlorocyclohexane may be incorporated in either water base, oil base, or emulsion drilling fluids to provide a bridge over pores or fractures in such oil producing formations. Such a bridge will be removed by subsequent oil production. Furthermore, the hexachlorocyclohexane, being relatively water insoluble, will often function to shut off water when small particles penetrate water-producing formations. Manifestly, this invention is not limited to the examples given above and is capable of substantial modification and a number of uses.

I claim:

1. A composition suitable for temporarily sealing flow channels in an oil-producing formation penetrated by a well comprising a carrier liquid having dispersed therein solid hexachlorocyclohexane, said carrier liquid having a viscosity of at least about 30 centipoises to support said solid hexachlorocyclohexane, and said hexachlorocyclohexane having a particle size distribution in which 0 to about 75 percent of the particles are in the range passing a number 4 sieve and retainable on a number 10 sieve, from about 15 to about 90 percent are in the range passing a number 10 sieve and retainable on a number 40 sieve, and from about 10 to about 80 percent are in the range passing a number 40 sieve and retainable on a number 100 sieve.

2. The composition of claim 1 in which said carrier liquid is a petroleum oil.

3. The composition of claim 1 in which said hexachlorocyclohexane is present in a concentration between about 50 and about 300 pounds per 42 gallon barrel of carrier liquid.

4. The composition of claim 1 in which said hexachlorocyclohexane is in the form of its alpha and beta isomers.

5. The composition of claim 1 in which said hexachlorocyclohexane has a melting point above about 200° F.

6. In a composition suitable for temporarily sealing flow channels in an oil-producing formation penetrated by a well, the combination of solid hexachlorocyclohexane having a gradation of sizes of particles passing a number 4 sieve and retainable on a number 100 sieve and a viscous carrier liquid for said hexachlorocyclohexane, said carrier liquid having a viscosity of at least about 30 centipoises.

7. The combination of claim 6 in which said carrier liquid is a petroleum oil.

8. The combination of claim 6 in which said hexachlorocyclohexane is present in a concentration between about 50 and about 300 pounds per 42-gallon barrel of said viscous liquid.

9. The combination of claim 6 in which said hexachlorocyclohexane is in the form of its alpha and beta isomers.

10. The combination of claim 6 in which said hexachlorocyclohexane has a melting point above about 200° F.

11. A process for sealing a flow channel in a formation penetrated by a well comprising injecting into said well a sufficient amount of the composition of claim 1 to seal said flow channel.

12. In a method for producing multiple fractures in a formation penetrated by a well, the steps of forcing a first quantity of fracturing liquid into said formation at a pressure sufficient to produce a first fracture in said formation, injecting into said well a sufficient amount of the composition of claim 1 to seal said first fracture, and then forcing a second quantity of fracturing liquid into said formation at a pressure sufficient to produce a second fracture in said formation.

13. The composition of claim 1 in which said carrier liquid is water.

14. The composition of claim 6 in which said carrier liquid is water.

References Cited in the file of this patent

UNITED STATES PATENTS

| | | |
|---|---|---|
| 2,734,861 | Scott et al. | Feb. 14, 1956 |
| 2,761,805 | Huidobro | Sept. 4, 1956 |